(12) United States Patent
Garg et al.

(10) Patent No.: US 12,423,243 B2
(45) Date of Patent: Sep. 23, 2025

(54) SYSTEMS AND METHODS FOR REDUCING CACHE FILLS

(71) Applicant: Advanced Micro Devices, Inc., Santa Clara, CA (US)

(72) Inventors: Alok Garg, Boxborough, MA (US); Matthew Sobel, Boxborough, MA (US); Alice Danielle Kivity, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/399,332

(22) Filed: Dec. 28, 2023

(65) Prior Publication Data
US 2025/0217298 A1 Jul. 3, 2025

(51) Int. Cl.
*G06F 12/0891* (2016.01)
(52) U.S. Cl.
CPC ............... *G06F 12/0891* (2013.01)

(58) Field of Classification Search
CPC .................................................. G06F 12/0891
See application file for complete search history.

(56) References Cited

U.S. PATENT DOCUMENTS

| | | | |
|---|---|---|---|
| 2002/0062354 A1* | 5/2002 | Suraski | G06F 16/9574 709/212 |
| 2016/0350232 A1* | 12/2016 | Knies | G06F 12/0888 |
| 2024/0111679 A1* | 4/2024 | Pugsley | G06F 12/0811 |

* cited by examiner

*Primary Examiner* — Sean D Rossiter
(74) *Attorney, Agent, or Firm* — Greenberg Traurig, LLP

(57) ABSTRACT

A method for reducing cache fills can include training a filter, by at least one processor and in response to at least one of eviction or rewrite of one or more entries of a cache, the filter indicating one or more cache loads from which the one or more entries were previously filled. The method can also include preventing, by the at least one processor and based on the trained filter, one or more subsequent fills to the cache from the one or more cache loads. Various other methods and systems are also disclosed.

20 Claims, 5 Drawing Sheets

SYSTEMS AND METHODS FOR REDUCING CACHE FILLS

BACKGROUND

Processing units, such as central processing units, parallel processors, and graphics processing units, can be tasked with processing ever-increasing amounts of data. Access to this data can be a significant factor in processing speed at which the processing unit can process data. To increase speed of access, cache systems can be employed. Conventional techniques used to implement cache systems, however, can be confronted with a variety of challenges, such as latency, throughput, and tradeoffs between size and speed. These challenges can hinder operation of processing units in conventional real-world scenarios, the effect of which can be compounded by ever-increasing amounts of data.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
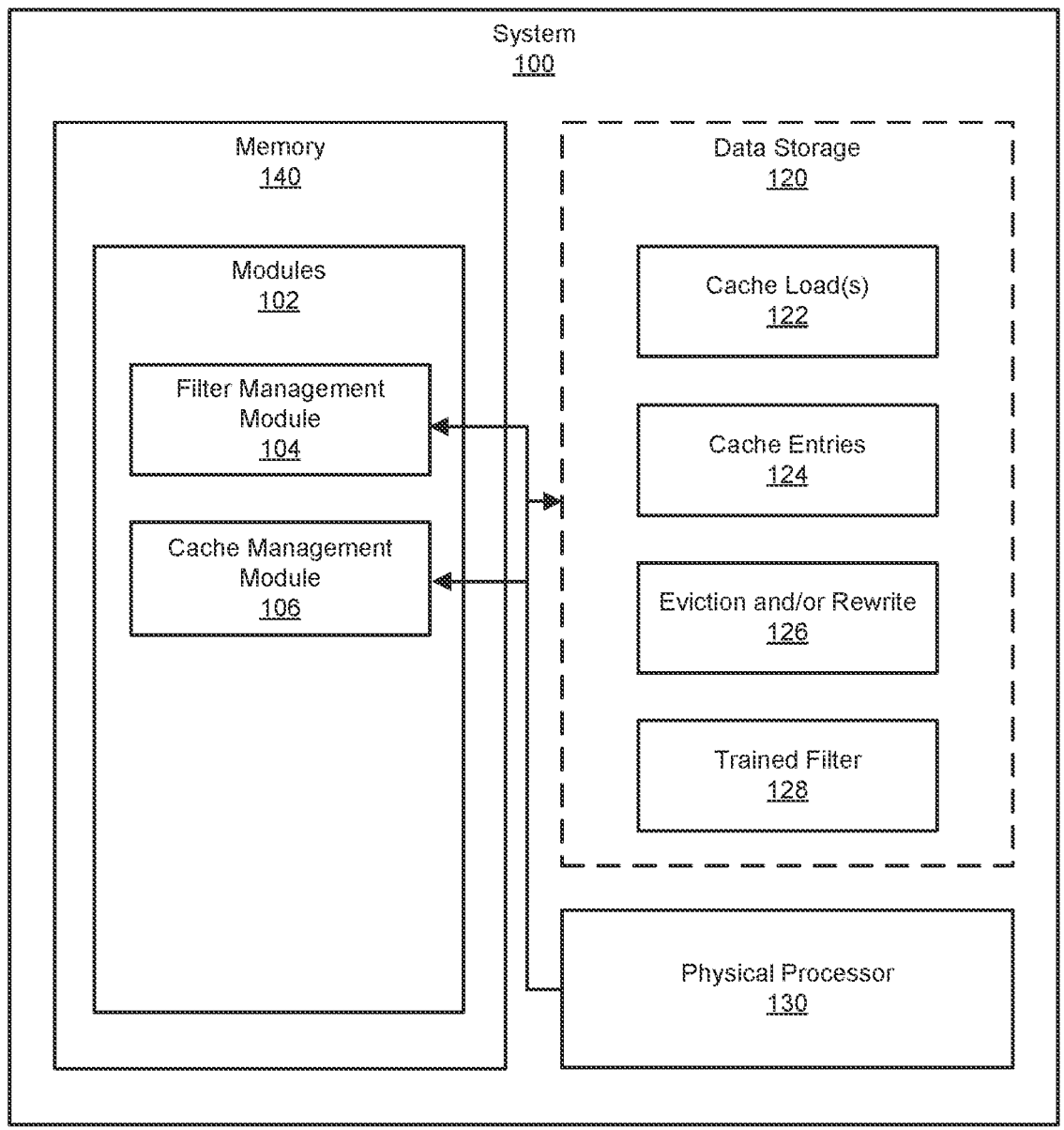
FIG. 1 is a block diagram of an example system for reducing cache fills.

Throughout the drawings, identical reference characters and descriptions indicate similar, but not necessarily identical, elements. While the examples described herein are susceptible to various modifications and alternative forms, specific implementations have been shown by way of example in the drawings and will be described in detail herein. However, the example implementations described herein are not intended to be limited to the particular forms disclosed. Rather, the present disclosure covers all modifications, equivalents, and alternatives falling within the scope of the appended claims.

DETAILED DESCRIPTION OF EXAMPLE IMPLEMENTATIONS

The present disclosure is generally directed to reducing cache fills. For example, fills to one or more levels of cache can be reduced using various mechanisms. One such mechanism can be a trained filter (e.g., blacklist) that prevents fills from loads that frequently store data in the cache that is later evicted or rewritten without the entry being sufficiently used to realize significant benefit from the caching of the data in that level of cache. For example, a load can write into a data reuse cache. Data reuse cache tags can capture a hashed version of the load's program counter along with its linear address and L1 way (e.g., number of cache lines per set in the Level 1 (L1) cache). A counter can be used per data reuse cache line to track the number of hits (e.g., by using a single bit flag to tell if there was a hit to the cache line). On eviction from the data reuse cache, the saved program counter hash can be used to hash into the blacklist filter (e.g., multiple loads per hash may share a same filter entry). A confidence counter per filter entry can be used for training (e.g., by using a 3-bit counter). The counter can be incremented if the evicted cache line counter is greater than '0' or otherwise decremented. The magnitude of increment and decrement can be implemented in various ways. For example, an increment by one can occur on capacity eviction, an increment by two can occur on eviction by a store, and/or a decrement can occur all the way to zero. A filter entry can be trained once the confidence counter reaches a threshold (e.g., seven). A load that is eligible to fill the data reuse cache can hash into the blacklist filter. It can fill a line into the data reuse cache if the blacklist filter is not trained to prevent fills from that load to that level of cache. In some implementations, an X-way set associative blacklist filter can be used that has Y entries, wherein X and Y are integers. A scrubbing mechanism can periodically traverse the filter entries and scrub one filter entry at a time (e.g., once per one thousand cycles). The trained filter can also feed back into the training of an additional filter (e.g., whitelist) by disabling training for filtered (e.g., blacklisted) loads. Another mechanism can prevent storage of data in a data reuse cache from a load that interacts with an inflight store. For example, the mechanism can avoid filling loads found to address match with inflight stores.

The term "inflight store," as used herein, can generally refer to a store instruction that is an execution in progress. For example, and without limitation, an inflight store can correspond to an instruction to store data at a particular address. In this context, a cache load can reference a same address as an older inflight store, in which case filling of the load can be avoided.

Reducing cache fills using one or more of the mechanisms disclosed herein can reduce a cache fill rate significantly (e.g., by approximately ninety-six percent). For example, preventing storage of data from loads that interact with inflight stores can reduce fills by approximately half (e.g., fifty percent or more reduction). Additionally, using the trained filter can further reduce fills approximately by a factor of eight. Further benefits can include energy savings from filling ninety-six percent fewer lines (e.g., an improvement exceeding an order of magnitude) and reduced whitelist training. Still further benefits can include a smaller cache resulting from reducing cache pollution while avoiding implementing a more complex mechanism that relies on particular load-store or non-load-reuse patterns.

Figure 2:
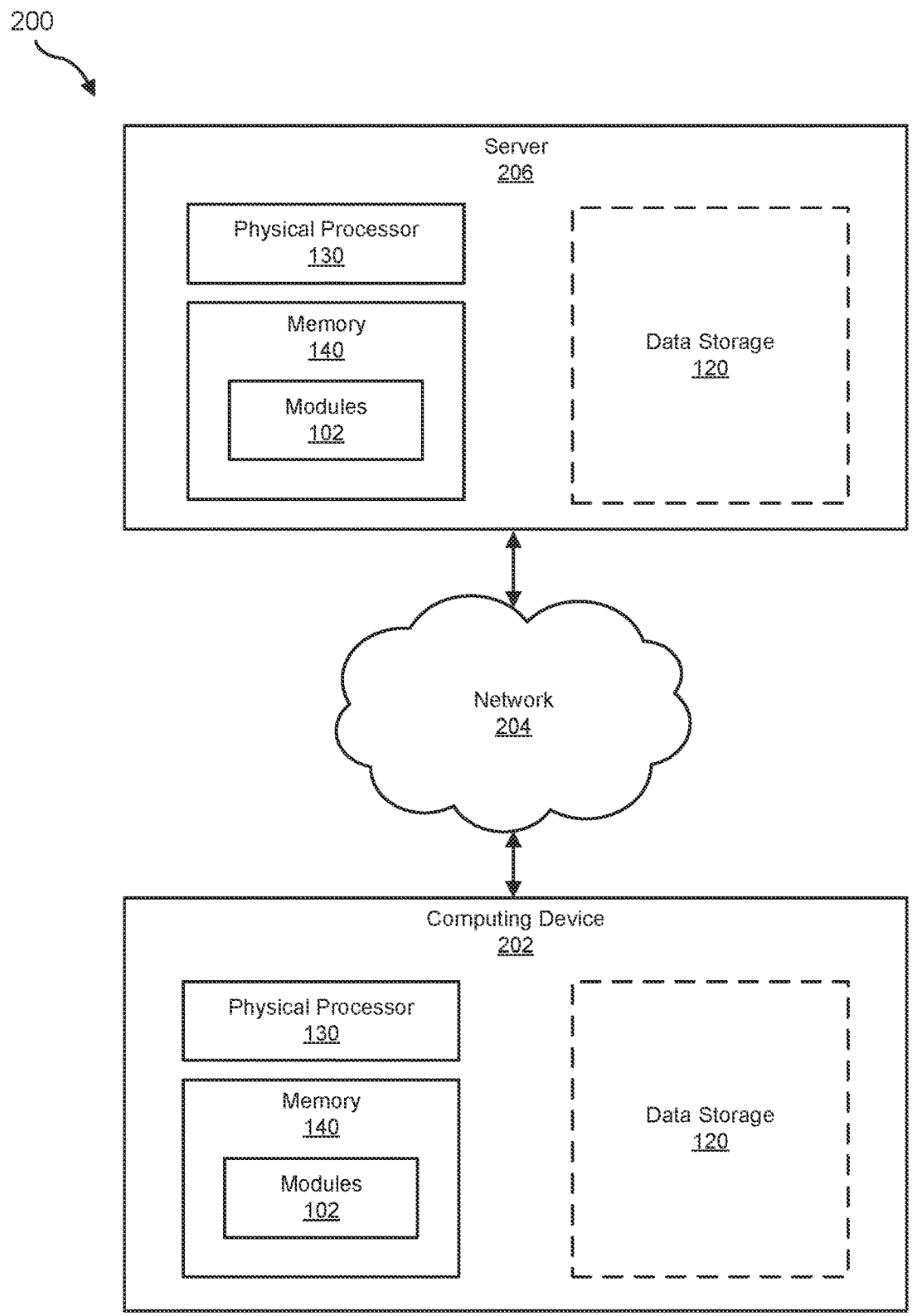
FIG. 2 is a block diagram of an additional example system for reducing cache fills.

The following will provide, with reference to FIGS. 1 and 2, detailed descriptions of example systems for reducing cache fills. Detailed descriptions of corresponding computer-implemented methods will also be provided in connection with FIG. 3. In addition, detailed descriptions of example systems configured to employ a data reuse cache will be provided in connection with FIG. 4. Further, detailed descriptions of example systems configured to reduce cache fills to a data reuse cache will be provided in connection with FIG. 5.

In one example, a computing device can include filter management circuitry configured train a filter, in response to at least one of eviction or rewrite of one or more entries of a cache, the filter indicating one or more cache loads from which the one or more entries were previously filled, and cache management circuitry configured to prevent, based on the trained filter, one or more subsequent fills to the cache from the one or more cache loads.

Another example can be the previously described example computing device, wherein the computing device is further configured to maintain a record of one or more hits on the one or more entries.

Another example can be any of the previously described example computing devices, wherein the filter management circuitry is further configured to detect, in response to the at least one of eviction or rewrite of one or more entries of the cache, satisfaction of a threshold condition based on the record.

Another example can be any of the previously described example computing devices, wherein the filter management circuitry is further configured to train the filter in response to the detection of the satisfaction of the threshold condition.

Another example can be any of the previously described example computing devices, wherein the filter management circuitry is further configured to scrub one or more entries of the trained filter.

Another example can be any of the previously described example computing devices, wherein the cache management circuitry is further configured to disable training of an additional filter, based on the filter, wherein the additional filter governs whether the one or more cache loads read data from the cache.

Another example can be any of the previously described example computing devices, wherein the cache management circuitry is further configured to disable training of the additional filter at least in part by preventing cache loads indicated in the filter form being indicated in the additional filter.

In one example, a system can include at least one physical processor and physical memory comprising computer-executable instructions that, when executed by the physical processor, cause the physical processor to train a filter, in response to at least one of eviction or rewrite of one or more entries of a cache, the filter indicating one or more cache loads from which the one or more entries were previously filled, and prevent, based on the trained filter, one or more subsequent fills to the cache from the one or more cache loads.

Another example can be the previously described example system, wherein the computer-executable instructions further cause the physical processor to maintain a record of one or more hits on the one or more entries.

Another example can be any of the previously described example systems, wherein the computer-executable instructions further cause the physical processor to detect, in response to the at least one of eviction or rewrite of one or more entries of the cache, satisfaction of a threshold condition based on the record.

Another example can be any of the previously described example systems, wherein the computer-executable instructions cause the physical processor to train the filter in response to the detection of the satisfaction of the threshold condition.

Another example can be any of the previously described example systems, wherein the computer-executable instructions further cause the physical processor to scrub one or more entries of the trained filter.

Another example can be any of the previously described example systems, wherein the computer-executable instructions further cause the physical processor to disable training of an additional filter, by the at least one processor and based on the filter, wherein the additional filter governs whether the one or more cache loads read data from the cache.

Another example can be any of the previously described example systems, wherein the computer-executable instructions further cause the physical processor to disable the training of the additional filter at least in part by preventing cache loads indicated in the filter from being indicated in the additional filter In one example, a computer-implemented method can include training a filter, by at least one processor and in response to at least one of eviction or rewrite of one or more entries of a cache, the filter indicating one or more cache loads from which the one or more entries were previously filled, and preventing, by the at least one processor and based on the trained filter, one or more subsequent fills to the cache from the one or more cache loads.

Another example can be the previously described computer-implemented method, further including maintaining a record, by the at least one processor, of one or more hits on the one or more entries.

Another example can be any of the previously described computer-implemented methods, further including detecting, by the at least one processor and in response to the at least one of eviction or rewrite of one or more entries of a cache, satisfaction of a threshold condition based on the record.

Another example can be any of the previously described computer-implemented methods, further including training the filter in response to the detection of the satisfaction of the threshold condition.

Another example can be any of the previously described computer-implemented methods, further including scrubbing, by the at least one processor, one or more entries of the trained filter.

Another example can be any of the previously described computer-implemented methods, further including disabling training of an additional filter, by the at least one processor and based on the filter, wherein the additional filter governs whether the one or more cache loads read data from the cache.

FIG. 1 is a block diagram of an example system 100 for reducing cache fills. As illustrated in this figure, example system 100 can include one or more modules 102 for performing one or more tasks. As will be explained in greater detail below, modules 102 can include a filter management module 104, and a cache management module 106. Although illustrated as separate elements, one or more of modules 102 in FIG. 1 can represent portions of a single module or application.

In certain implementations, one or more of modules 102 in FIG. 1 can represent one or more software applications or programs that, when executed by a computing device, can cause the computing device to perform one or more tasks. For example, and as will be described in greater detail below, one or more of modules 102 can represent modules stored and configured to run on one or more computing devices, such as the devices illustrated in FIG. 2 (e.g., computing device 202 and/or server 206). One or more of modules 102 in FIG. 1 can also represent all or portions of one or more special-purpose computers configured to perform one or more tasks.

As illustrated in FIG. 1, example system 100 can also include one or more memory devices, such as memory 140. Memory 140 generally represents any type or form of volatile or non-volatile storage device or medium capable of storing data and/or computer-readable instructions. In one example, memory 140 can store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 can also include one or more physical processors, such as physical processor 130. Physical processor 130 generally represents any type or form of hardware-implemented processing unit capable of interpreting and/or executing computer-readable instructions. In one example, physical processor 130 can access and/or modify one or more of modules 102 stored in memory 140. Additionally or alternatively, physical processor 130 can execute one or more of modules 102 to facilitate reducing cache fills. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

The term "modules," as used herein, can generally refer to one or more functional components of a computing device. For example, and without limitation, a module or modules can correspond to hardware, software, or combinations thereof. In turn, hardware can correspond to analog circuitry, digital circuitry, communication media, or combinations thereof. In some implementations, the modules can be implemented as microcode (e.g., a collection of instructions running on a micro-processor, digital and/or analog circuitry, etc.) and/or one or more firmware in a graphics processing unit. For example, a module can correspond to a GPU, a trusted micro-processor of a GPU, and/or a portion thereof (e.g., circuitry (e.g., one or more device features sets and/or firmware) of a trusted micro-processor).

As illustrated in FIG. 1, example system 100 can also include one or more instances of stored data, such as data storage 120. Data storage 120 generally represents any type or form of stored data, however stored (e.g., signal line transmissions, bit registers, flip flops, software in rewritable memory, configurable hardware states, combinations thereof, etc.). In one example, data storage 120 includes databases, spreadsheets, tables, lists, matrices, trees, or any other type of data structure. Examples of data storage 120 can include, without limitation, cache loads 122, cache entries 124, eviction and/or rewrite 126, and/or trained filter 128.

Example system 100 in FIG. 1 can be implemented in a variety of ways. For example, all or a portion of example system 100 can represent portions of example system 200 in FIG. 2. As shown in FIG. 2, system 200 can include a computing device 202 in communication with a server 206 via a network 204. In one example, all or a portion of the functionality of modules 102 can be performed by computing device 202, server 206, and/or any other suitable computing system. As will be described in greater detail below, one or more of modules 102 from FIG. 1 can, when executed by at least one processor of computing device 202 and/or server 206, enable computing device 202 and/or server 206 to reduce cache fills.

Computing device 202 generally represents any type or form of computing device capable of reading computer-executable instructions. In some implementations, computing device 202 can be and/or include one or more graphics processing units having a chiplet processor connected by a switch fabric. Additional examples of computing device 202 include, without limitation, platforms such as laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device. Alternatively or additionally, computing device 202 can correspond to a device operating within such a platform.

Server 206 generally represents any type or form of platform that provides cloud service (e.g., cloud gaming server) that includes one or more computing devices 202. In some implementations, server 206 can be and/or include a cloud service (e.g., cloud gaming server) that includes one or more graphics processing units having a chiplet processor connected by a switch fabric. Additional examples of server 206 include, without limitation, storage servers, database servers, application servers, and/or web servers configured to run certain software applications and/or provide various storage, database, and/or web services. Although illustrated as a single entity in FIG. 2, server 206 can include and/or represent a plurality of servers that work and/or operate in conjunction with one another.

Network 204 generally represents any medium or architecture capable of facilitating communication or data transfer. In one example, network 204 can facilitate communication between computing device 202 and server 206. In this example, network 204 can facilitate communication or data transfer using wireless and/or wired connections. Examples of network 204 include, without limitation, a Peripheral Component Interconnect express (PICe) bus, a Nonvolatile memory express (Nvme) bus, a Local Area Network (LAN), a Personal Area Network (PAN), Power Line Communications (PLC), portions of one or more of the same, variations or combinations of one or more of the same, or any other suitable network that enables the computing device 202 to perform data communication with other components on the platform of server 206. In other examples, network 204 can be an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems can be connected to system 100 in FIG. 1 and/or system 200 in FIG. 2. Conversely, all of the components and devices illustrated in FIGS. 1 and 2 need not be present to practice the implementations described and/or illustrated herein. The devices and subsystems referenced above can also be interconnected in different ways from that shown in FIG. 2. Systems 100 and 200 can also employ any number of software, firmware, and/or hardware configurations. For example, one or more of the example implementations disclosed herein can be encoded as a computer program (also referred to as computer software, software applications, computer-readable instructions, and/or computer control logic) on a computer-readable medium.

The term "computer-readable medium," as used herein, can generally refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
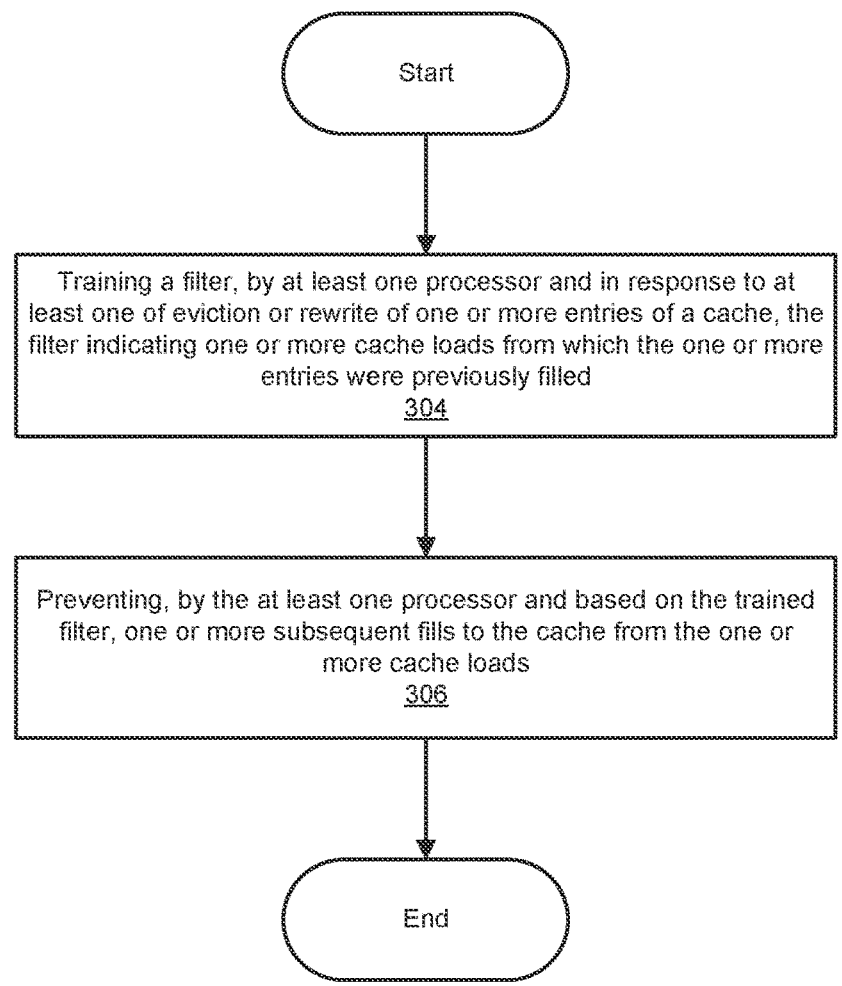
FIG. 3 is a flow diagram of an example method for reducing cache fills.

FIG. 3 is a flow diagram of an example computer-implemented method 300 for reducing cache fills. The steps shown in FIG. 3 can be performed by any suitable computer-executable code and/or computing system, including system 100 in FIG. 1, system 200 in FIG. 2, and/or variations or combinations of one or more of the same. In one example, each of the steps shown in FIG. 3 can represent an algorithm whose structure includes and/or is represented by multiple sub-steps, examples of which will be provided in greater detail below.

The term "computer-implemented method," as used herein, can generally refer to a method performed by hardware or a combination of hardware and software. For example, hardware can correspond to analog circuitry, digital circuitry, communication media, or combinations thereof. In some implementations, hardware can correspond to digital and/or analog circuitry arranged to carry out one or more portions of the computer-implemented method. In some implementations, hardware can correspond to physical processor 130 of FIG. 1. Additionally, software can correspond to software applications or programs that, when executed by the hardware, can cause the hardware to perform one or more tasks that carry out one or more portions of the computer-implemented method. In some implementations, software can correspond to one or more of modules 102 stored in memory 140 of FIG. 1.

As illustrated in FIG. 3, at step 302 one or more of the systems described herein can manage a filter. For example, filter management module 104 can, as part of computing device 202 in FIG. 2, train a filter, by the at least one processor and in response to at least one of eviction or rewrite of one or entries of a cache, that indicates one or more cache loads from which the one or more entries were previously filled.

The term "cache," as used herein, can generally refer to hardware and/or software that is used to store something, usually data, temporarily in a computing environment. For example, and without limitation, cache can refer to a small amount of faster, more expensive memory used to improve the performance of recently or frequently accessed data. In this context, an "entry" of a cache can be a line of a cache in which data is temporarily stored.

The term "eviction," as used herein, can generally refer to a feature where file data blocks in the cache are released. For example, and without limitation, eviction can refer to feature where file data blocks in the cache are released when fileset usage exceeds the fileset soft quota, and space is created for new files.

The term "rewrite," as used herein, can generally refer to a cache read/write operation. For example, and without limitation, rewrite can refer to a read-through, write-through, refresh-ahead, and/or write-behind operation on a cache entry.

The term "filter," as used herein, can generally refer to a program or section of code that's designed to examine each input or output request for certain qualifying criteria and then process or forward it accordingly. For example, filter can refer to a whitelist and/or blacklist that can govern cache accesses and/or cache fills.

The term "train," as used herein, can generally refer to preparing or modifying a data structure. For example, train can refer to adding and/or removing entries to and from a whitelist and/or a blacklist that can govern cache accesses and/or cache fills.

The term "cache load," as used herein, can generally refer to a process that stores data in a temporary storage location so they can be accessed faster. For example, and without limitation, a cache load can be a process to store data using a particular cache entry index or address (e.g., hash) used to access the data in the cache.

The systems described herein can perform step 302 in a variety of ways. In one example, computing device 202 in FIG. 2 can maintain a record, by the at least one processor, of one or more hits on the one or more entries. In some implementations, computing device 202 in FIG. 2 can maintain the record by incrementing a counter for a cache entry in response to a hit on the cache entry. In some implementations, computing device 202 in FIG. 2 can detect one or more of hits, evictions, and/or rewrites of a cache entry based on an event listener, a pull high or low on a signal line, etc. Additionally, computing device 202 in FIG. 2 can notify and/or trigger filter management module 104 in response to an eviction and/or rewrite of the cache entry. In some implementations, the notification and/or trigger can identify the cache entry and include a recorded counter value for the cache entry. In some implementations, computing device 202 in FIG. 2 can issue the notification and/or trigger by issuing an event and/or pulling a signal line high or low.

In one example, filter management module 104 can, as part of computing device 202 in FIG. 2, detect, by the at least one processor and in response to the at least one eviction or rewrite of one or more entries of the cache, satisfaction of a threshold condition based on the record (e.g., the counter value falls below a threshold number of hits on the cache entry). In some implementations training the filter, by filter management module 104, can occur in response to the detection of the satisfaction of the threshold condition. In some implementations, filter management module 104 can, as part of computing device 202 in FIG. 2, train the filter by adding the one or more cache loads (e.g., adding a hash representing one or multiple cache loads that hash into that cache entry) to a filter implemented as a blacklist. Implementation of the filter as a blacklist can be beneficial (e.g., result in a smaller filter) when a number of cache entries that satisfy the threshold condition is smaller than a number of cache entries that do not. In other implementations, filter management module 104 can, as part of computing device 202 in FIG. 2, train the filter by removing the one or more cache loads (e.g., removing a hash representing one or multiple cache loads that hash into that cache entry) from a filter implemented as a whitelist. Implementation of the filter as a whitelist can be beneficial (e.g., result in a smaller filter) when a number of cache entries that satisfy the threshold condition is greater than a number of cache entries that do not. In some implementations, filter management module 104 can, as part of computing device 202 in FIG. 2, dynamically implement the filter as a blacklist or whitelist based on a ratio of such cache entries. In some implementations, filter management module 104 can, as part of computing device 202 in FIG. 2, periodically scrub, by the at least one processor, one or more entries of the trained filter. For example, filter management module 104 can, as part of computing device 202 in FIG. 2, cycle through filter entries and scrub one filter entry every scrubbing period (e.g., one-thousand cycles). In some implementations, filter management module 104 can, as part of computing device 202 in FIG. 2, scrub a filter entry by removing the entry from a filter implemented as a blacklist. Alternatively or additionally, filter management module 104 can, as part of computing device 202 in FIG. 2, scrub a filter entry by adding the entry to a filter implemented as a whitelist.

At step 304 one or more of the systems described herein can manage a cache. For example, cache management module 106 can, as part of computing device 202 in FIG. 2, prevent, by the at least one processor and based on the trained filter, one or more subsequent fills to the cache from the one or more cache loads.

The term "prevent," as used herein, can generally refer to refraining, by a cache controller, from copying a cache line from main memory on a cache miss. For example, and without limitation, a cache controller can be configured to respond to a cache miss by copying an entire cache line from main memory to cache memory and providing requested code or data to a processor. The copying of a cache line form main memory to cache memory can correspond to a cache line fill. In this context, a cache controller can prevent a fill to a cache by responding to a cache miss from a blacklisted load by merely retrieving code or data requested by the blacklisted load form main memory and providing the code or data to a processor, while refraining from copying the cache line from main memory to cache memory.

The systems described herein can perform step 304 in a variety of ways. In one example, cache management module 106 can, as part of computing device 202 in FIG. 2, prevent any and all additional fills to the cache by cache loads included in a filter implemented as a blacklist (e.g., cache fills that hash into the cache with a hash matching a blacklist entry). Additionally or alternatively, cache management module 106 can, as part of computing device 202 in FIG. 2, prevent any and all additional fills to the cache by cache loads absent from a filter implemented as a whitelist (e.g., cache fills that hash into the cache with a hash not matching a whitelist entry). In some implementations, cache management module 106 can, as part of computing device 202 in FIG. 2, additionally prevent, by the at least one processor, one or more further fills to a data reuse cache that interact with an inflight store. In some of these implementations, cache management module 106 can, as part of computing device 202 in FIG. 2, detect an address match between the inflight store and the one or more fills to the data reuse cache and additionally prevent the one or more further fills in response to the detection of the address match. In some implementations, cache management module 106 can, as part of computing device 202 in FIG. 2, disable training of an additional filter, by the at least one processor and based on the filter. In some of these implementations, the additional filter can govern whether the one or more cache loads read data from the cache. For example, in the context of the filter being implemented as a blacklist and the additional filter being implemented as a whitelist, the cache management module 106 can be configured to disable training of the additional filter at least in part by preventing cache loads indicated in the filter from being indicate din the additional filter.

Figure 4:
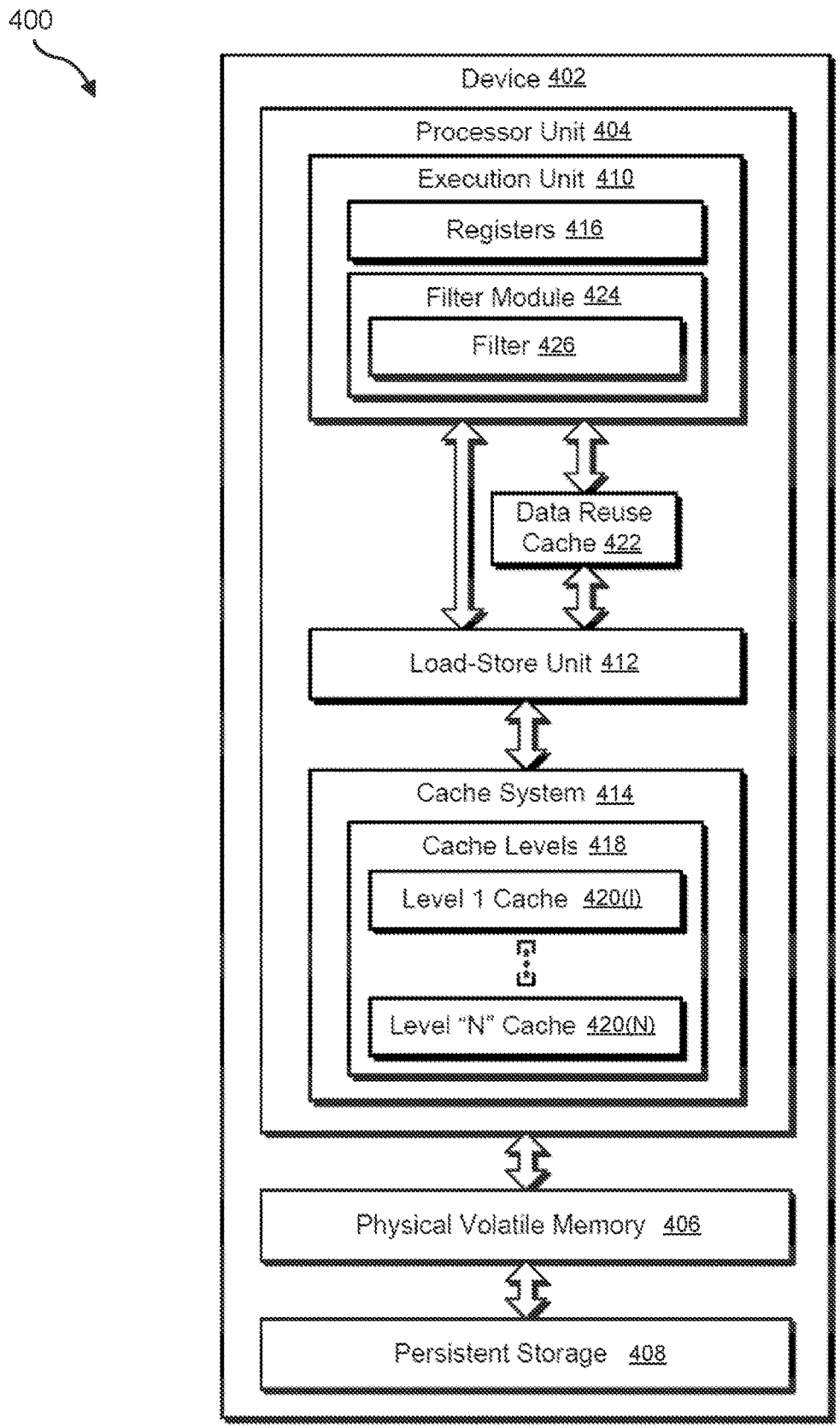
FIG. 4 is a block diagram illustrating an example system configured to employ a data reuse cache.
Figure 5:
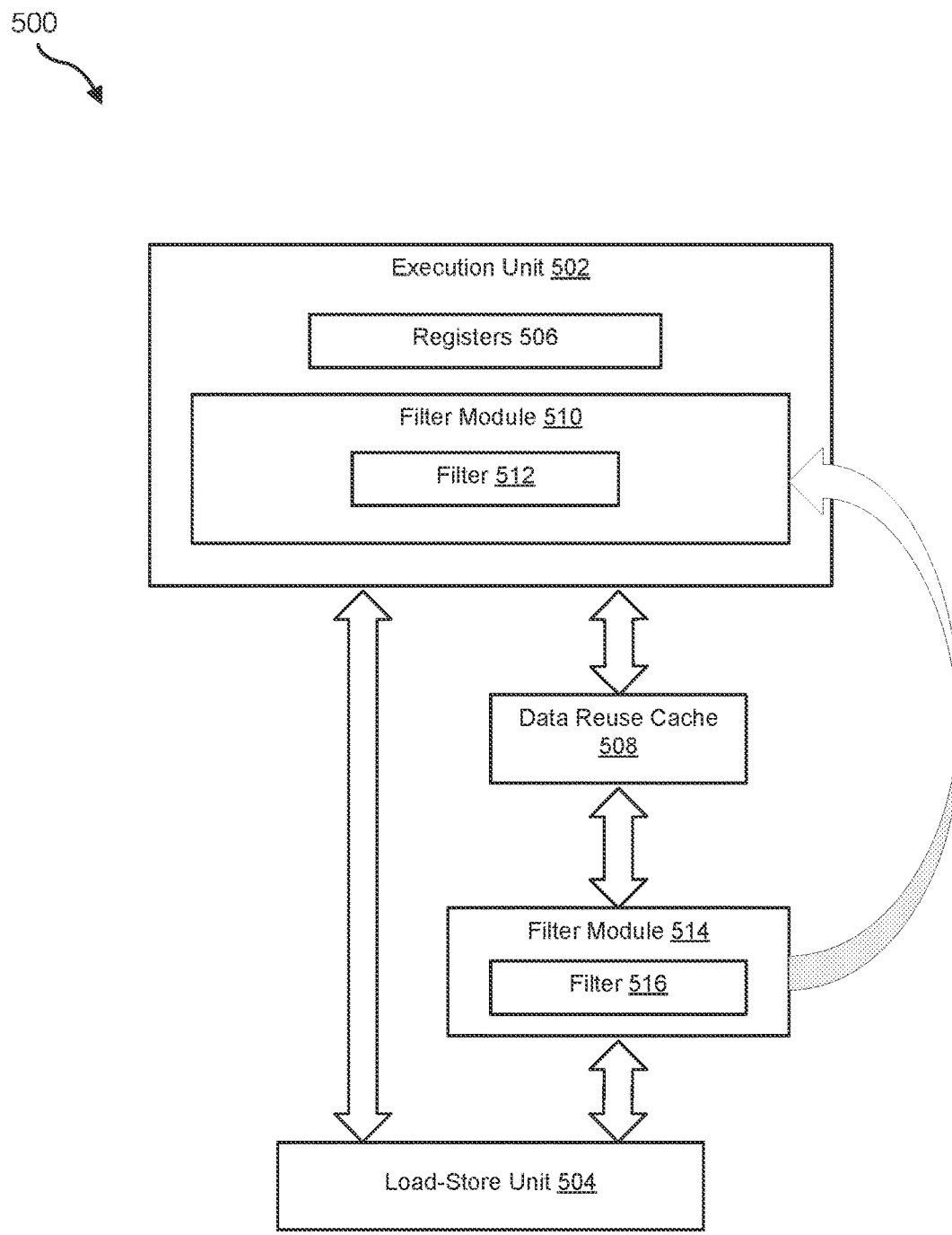
FIG. 5 is a block diagram illustrating an example system configured to reduce cache fills to a data reuse cache.

FIGS. 4 and 5 present a data reuse cache and an implementation of the disclosed systems and methods with a data reuse cache. However, it should be understood that the disclosed systems and methods can be employed with any level of cache and/or with multiple levels of cache. Additional details of example data reuse caches are provided in U.S. Pat. No. 12,066,940, the disclosure of which is incorporated herein in its entirety.

FIG. 4 illustrates an example system 100 configured to employ data reuse cache techniques. The system 400 includes a device 402 having a processor unit 404, physical volatile memory 406 (e.g., random access memory), and persistent storage 408 (e.g., a hard drive). The device 402 can be configurable in terms of computing devices, servers, mobile devices (e.g., wearables, mobile phones, tablets, laptops), processors (e.g., graphics processing units, central processing units, and accelerators), digital signal processors, disk array controllers, hard disk drive host adapters, memory cards, solid-state drives, wireless communications hardware connections, Ethernet hardware connections, switches, bridges, network interface controllers, and other apparatus configurations. In various implementations, the device 402 can be configured as any one or more of these devices and/or a variety of other devices as disclosed herein.

The processor unit 404 can include an execution unit 410, a load-store unit 412, and a cache system 414. The execution unit 410 can be representative of functionality of the processor unit 404 implemented in hardware that performs operations (e.g., based on instructions received through execution of software). The execution unit 410 can include registers 416 that are configured to maintain data that is processed by the execution unit 410 (e.g., for arithmetic and logic operations).

The load-store unit 412 can be representative of functionality of the processor unit 404 to execute load and store instructions. Load instructions and corresponding operations can involve loading data from the cache system 414, physical volatile memory 406, and/or persistent storage 408 to the registers 416 of the execution unit 410 for processing. Store instructions and corresponding operations can include storing data from the registers 416 (e.g., after processing by the execution unit 410) back to the cache system 414, physical volatile memory 406, and/or persistent storage 408.

The load-store unit 412, for instance, can be configured to support use of virtual memory by translating virtual memory addresses used by software to physical memory addresses. Virtual memory is a technique to manage use of shared physical memory. Virtual memory supports a variety of different functionalities. Examples of these functionalities can include expansion of an amount of storage made available to applications beyond that which is actually available in the physical memory, offload memory management from applications and operating systems, use of a variety of different types of memory without the applications being made aware, support of memory optimization, and/or address memory fragmentation.

The cache system 414 can includes a plurality of cache levels 418, such as a level 1 cache 120(1) through a level "N" cache 120(N). Configuration of the cache levels 418 can be utilized to take advantage of a variety of locality factors. Spatial locality can be used to improve operation in situations in which data is requested that is stored physically close to data that is a subject of a previous request. Temporal locality can be used to address scenarios in which data that has already been requested will be requested again.

In cache operations, a "hit" can occur to a cache level when data that is the subject of a load operation is available via the cache level, and a "miss" can occur when the desired data is not available via the cache level. When employing multiple cache levels, requests can proceed through successive cache levels 418 until the data is located. The cache system 414 can be configurable in a variety of ways (e.g., in hardware) to address a variety of processor unit 404 configurations, such as a central processing unit cache, graphics processing unit cache, parallel processor unit cache, and/or digital signal processor cache.

The processor unit 404 can also include a data reuse cache 422. The data reuse cache 422 can be physically located on the processor unit 404 (e.g., using hardware circuitry on an integrated circuit) between the load-store unit 412 and the execution unit 410. The data reuse cache 422 can be configured to leverage scenarios in which data loaded by a load instruction of the load-store unit 412 is accessed again in succession (e.g., by itself or other instructions). Keeping this data close to the execution unit 410 for faster reuse can reduce a cost incurred in loading the data from the cache levels 418 (e.g., the level 1 cache 120(1)). In one example, the data reuse cache 422 can be accessible in parallel with the cache system 414 through the load-store unit 412 (e.g., with a level 1 data cache).

The data reuse cache 422 can be configurable to be "filled" based on load responses generated by the load-store unit 412. In one example, the data reuse cache 422 is configured, solely, for data reuse. Any load response from the load-store unit 412 can be usable to fill the data reuse cache 422, (e.g., from cache levels 418 of the cache system 414, physical volatile memory 406, and/or persistent storage 408). In an implementation, complex memory data communication can be delegated to the load-store unit 412, thereby increasing operational efficiency. In this way, a likelihood that data stored in the data reuse cache 422 is relevant to subsequent load instructions can be increased, thereby reducing a probability of a cache miss.

In another example of techniques usable to solve these problems, a filter module 424 and filter 426 can be employed by the execution unit 410 to manage load operations. The filter module 424 can employ the filter 426 to control access by the load operations to the data reuse cache 422. Load operations that have a lower than a threshold amount of likelihood of resulting in a hit to the data reuse cache 422, for instance, can be restricted from accessing the data reuse cache 422. Instead, these load operations can be targeted directly to the cache levels 418 through the load-store unit 412.

As a result, a performance penalty as would otherwise be encountered by a cache miss to the data reuse cache 422 can be avoided, thereby supporting implementation as a smaller cache having increased access efficiency (i.e., speed). Other examples can include use of virtual memory addresses by the data reuse cache 422, use of a self-broadcast to wake-up dependent operations rather than employ a conventional broadcast, and leverage of logic in the load-store unit 412 to verify data correctness such as ordering violation and data integrity.

FIG. 5 illustrates an example system 500 configured to reduce cache fills to a data reuse cache. System 500 can have components similar to components of system 400 of FIG. 4, such as execution unit 502, load store unit 504, registers 506, data reuse cache 508, filter module 510, and filter 512. Respectively, these components can be similar or identical to execution unit 410, load store unit 412, registers 416, data reuse cache 422, filter module 424, and filter 426 of system 400 of FIG. 4. In addition to execution unit 502, load store unit 504, registers 506, data reuse cache 508, filter module 510, and filter 512, system 500 can have additional components that are similar or identical to other components of system 400 of FIG. 4, such as device 402, processor unit 404, physical volatile memory 406, persistent storage 408, cache system 414, and/or cache levels 418. However, rather than being configured so that any load response from the load-store unit 412 can be usable to fill the data reuse cache 422, (e.g., from cache levels 418 of the cache system 414, physical volatile memory 406, and/or persistent storage 408) as described with reference to FIG. 4, system 500 can have a filter module 514 and filter 516 that can reduce fills to data reuse cache 508 from load store unit 504.

Filling data reuse cache 508 for all loads consumes hardware, area, and energy and can also pollute the cache. Extra hardware support and area can be required to support multiple fills every cycle. Every fill to DRC costs energy. Filling for all loads can kick-out useful lines from DRC and may install a line never referenced by a future load.

With system 400 of FIG. 4, a good portion of filled data reuse cache 422 lines are never referenced before their eviction either due to capacity or by a probe (store/L1 DC back probe). In contrast, filter module 514, which can be located between load store unit 504 and data reuse cache 508, can avoid filling a load that interacts with an older inflight store. Since a store invalidates a data reuse cache 508 entry on completion, the same line filled by a younger load can be useless and can even trigger an unnecessary resynchronization. Avoiding filling loads found to address match with older inflight stores can reduce the number of fills by approximately sixty-seven percent.

Filter module 514 additionally can avoid filling loads that are followed by younger stores to a same address (e.g., read modified write). The line filled by a load that is followed by a younger store can have a high chance of being invalidated before it receives a demand hit. Explicitly tracking these load-store pairs using tables in hardware can be expensive and might not be accurate enough for selectively filtering out desired cases.

Filter module 514 can train and use filter 516 to avoid non-reuse fills (e.g., younger stores to a same address). Due to its small size, data reuse cache 508 can usually capture data that is temporal in nature. Fills that are not reused within a short window of time can be unlikely to hit in data reuse cache 508 and can pollute the data reuse cache 508. To filter out unwanted fills, filter module 514 can use a filter 516 (e.g., blacklist) based on program counters (e.g., register extension (REX) instruction pointers (rIPs)) to identify and filter out loads whose fills are consistently evicted from data reuse cache 508 without a demand hit.

Filter module 514 can train filter 516 on data reuse cache 508 eviction and/or rewrite using the program counter of a load that filled the line (e.g., entry). Each line can track the installer load's program counter and a flag to indicate a demand hit. An evicted line without a demand hit can increment the counter in the filter corresponding to the load's program counter until saturation and reset and/or decrement the counter if filter module 514 observes a demand hit. A saturated counter can indicate that the load can be blacklisted from filling data reuse cache 508. Incrementing the counter by two on a probe and by one on capacity eviction can improve the accuracy of the filter 516. The filter 516 can be a set-associative structure indexed and tagged by the hashed version of a program counter. An entry can be allocated for a program counter only when an eviction without a demand hit is observed.

All loads can initially be eligible to fill the data reuse cache 508 before the filter is trained. To detect and retrain for any change in the program behavior, filter module 514 can use a scrubbing mechanism to periodically reset a filter's entry. The filter can achieve a more than eight fold reduction in data reuse cache 508 fills while reducing the hit rate by less than ten percent. Loads in the filter 516 can also be unlikely to hit in the data reuse cache 508. Additional power can be saved by avoiding data reuse cache 508 tag lookup for loads trained by the filter 516. Both of these mechanisms combined can reduce the fill rate by ninety-six percent and improve hit-to-fill ratio of data reuse cache 508 lines from 0.05 to 0.32.

Numerous benefits can be realized. For example, a ninety-six percent reduction in fill rates can further help reduce the number of data reuse cache 508 fill ports to one. Also, energy savings can result from filling ninety-six percent fewer lines. Additionally, the filter 516 can also facilitate building of a smaller cache by reducing cache pollution. Further, filter 516 can catch most cases of un-useful fills without relying on a particular load-store or non-load-reuse pattern. Finally, filter module 514 can communicate filter 516 to filter module 510, which can disable training of filter 512 for loads in filter 516. In this context, filter 512 can be an additional filter as described herein that governs access to the data reuse cache 508. For example, if loads are prevented from filling a cache, then allowing those loads to attempt to read from that cache can waste resources (e.g., time, energy, processing resources, etc.). Thus, reducing accesses to the data reuse cache 508 for loads that are prevented from filling the data reuse cache 508 can realize still further benefits, such as power savings and reduced latency. In the context of filter 516 being a implemented as a blacklist and filter 516 being implemented as a whitelist, cache loads indicated in filter 516 can be removed from the filter 512 and training of filter 512 can be disabled in a manner that prevents cache loads indicated in the filter 516 from being indicated in the filter 512 as long as they are present in filter 516.

As set forth above, the disclosed systems and methods can reduce cache fills by using a trained filter (e.g., blacklist) that prevents fills from loads that frequently store data in the cache that is later evicted or rewritten without the entry being sufficiently used to realize significant benefit from the caching of the data in that level of cache. For example, loads can hash into the data reuse cache (e.g., multiple loads per hash that use the same data) and counters can be used per cache entry to track the number of hits. If eviction or rewrite occurs before the counter reaches a threshold, the hash can be added to the filter. A scrubbing mechanism can periodically traverse the filter entries and scrub one filter entry at a time (e.g., once per one thousand cycles). The trained filter can also feed back into the training of an additional filter (e.g., whitelist) by disabling training for filtered (e.g., blacklisted) loads. Another mechanism can prevent storage of data from a load that interacts with an inflight store. For example, the mechanism can avoid filling loads found to address match with inflight stores.

Reducing cache fills using one or more of the mechanisms disclosed herein can reduce a cache fill rate significantly (e.g., by approximately ninety-six percent). For example, preventing storage of data from loads that interact with inflight stores can reduce fills by approximately half (e.g., fifty percent or more reduction). Additionally, using the trained filter can further reduce fills by an approximate factor of eight. Further benefits can include energy savings from filling ninety-six percent fewer lines (e.g., an improvement exceeding an order of magnitude) and reduced whitelist training. Still further benefits can include a smaller cache resulting from reducing cache pollution while avoiding implementing a more complex mechanism that relies on particular load-store or non-load-reuse patterns.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In various implementations, all or a portion of example system 100 in FIG. 1 can facilitate multi-tenancy within a cloud-based computing environment. In other words, the modules described herein can configure a computing system (e.g., a server) to facilitate multi-tenancy for one or more of the functions described herein. For example, one or more of the modules described herein can program a server to enable two or more clients (e.g., customers) to share an application that is running on the server. A server programmed in this manner can share an application, operating system, processing system, and/or storage system among multiple customers (i.e., tenants). One or more of the modules described herein can also partition data and/or configuration information of a multi-tenant application for each customer such that one customer cannot access data and/or configuration information of another customer.

According to various implementations, all or a portion of example system 100 in FIG. 1 can be implemented within a virtual environment. For example, the modules and/or data described herein can reside and/or execute within a virtual machine. As used herein, the term "virtual machine" can generally refer to any operating system environment that is abstracted from computing hardware by a virtual machine manager (e.g., a hypervisor).

In some examples, all or a portion of example system 100 in FIG. 1 can represent portions of a mobile computing environment. Mobile computing environments can be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments can have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein can be provided for a mobile computing environment and/or can interact with a mobile computing environment.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computing device, comprising:
   filter management circuitry configured to train a filter, in response to at least one of eviction or rewrite of one or more entries of a cache, the filter indicating one or more cache loads from which the one or more entries were previously filled; and
   cache management circuitry configured to prevent, based on the trained filter, one or more subsequent fills to the cache from the one or more cache loads.

2. The computing device of claim 1, wherein the computing device is further configured to maintain a record of one or more hits on the one or more entries.

3. The computing device of claim 2, wherein the filter management circuitry is further configured to detect, in response to the at least one of eviction or rewrite of one or more entries of the cache, satisfaction of a threshold condition based on the record.

4. The computing device of claim 3, wherein the filter management circuitry is further configured to train the filter in response to the detection of the satisfaction of the threshold condition.

5. The computing device of claim 1, wherein the filter management circuitry is further configured to scrub one or more entries of the trained filter.

6. The computing device of claim 1, wherein the cache management circuitry is further configured to disable training of an additional filter, based on the filter, wherein the additional filter governs whether the one or more cache loads read data from the cache.

7. The computing device of claim 6, wherein the cache management circuitry is configured to disable the training of the additional filter at least in part by preventing cache loads indicated in the filter from being indicated in the additional filter.

8. A system comprising:
   at least one physical processor; and
   physical memory comprising computer-executable instructions that, when executed by the physical processor, cause the physical processor to:
      train a filter, in response to at least one of eviction or rewrite of one or more entries of a cache, the filter indicating one or more cache loads from which the one or more entries were previously filled; and
      prevent, based on the trained filter, one or more subsequent fills to the cache from the one or more cache loads.

9. The system of claim 8, wherein the computer-executable instructions further cause the physical processor to:
   maintain a record of one or more hits on the one or more entries.

10. The system of claim 9, wherein the computer-executable instructions further cause the physical processor to:
    detect, in response to the at least one of eviction or rewrite of one or more entries of the cache, satisfaction of a threshold condition based on the record.

11. The system of claim 10, wherein the computer-executable instructions cause the physical processor to:
    train the filter in response to the detection of the satisfaction of the threshold condition.

12. The system of claim 8, wherein the computer-executable instructions further cause the physical processor to:
    scrub one or more entries of the trained filter.

13. The system of claim 8, wherein the computer-executable instructions further cause the physical processor to:
    disable training of an additional filter, by the at least one processor and based on the filter, wherein the additional filter governs whether the one or more cache loads read data from the cache.

14. The system of claim 13, wherein the computer-executable instructions further cause the physical processor to:
    disable the training of the additional filter at least in part by preventing cache loads indicated in the filter from being indicated in the additional filter.

15. A computer-implemented method comprising:
    training a filter, by at least one processor and in response to at least one of eviction or rewrite of one or more entries of a cache, the filter indicating one or more cache loads from which the one or more entries were previously filled; and
    preventing, by the at least one processor and based on the trained filter, one or more subsequent fills to the cache from the one or more cache loads.

16. The computer-implemented method of claim 15, further comprising:
    maintaining a record, by the at least one processor, of one or more hits on the one or more entries.

17. The computer-implemented method of claim 16, further comprising:
    detecting, by the at least one processor and in response to the at least one of eviction or rewrite of one or more entries of the cache, satisfaction of a threshold condition based on the record.

18. The computer-implemented method of claim 17, further comprising:
    training the filter in response to the detection of the satisfaction of the threshold condition.

19. The computer-implemented method of claim 15, further comprising:
    scrubbing, by the at least one processor, one or more entries of the trained filter.

20. The computer-implemented method of claim 15, further comprising:
disabling training of an additional filter, by the at least one processor and based on the filter, wherein the additional filter governs whether the one or more cache loads read data from the cache.

\* \* \* \* \*